United States Patent [19]

Boeck et al.

[11] 4,137,562

[45] Jan. 30, 1979

[54] DATA ACQUISITION FROM MULTIPLE SOURCES

[75] Inventors: Joachim Boeck, Ganderkesee; Peter Dunker, Stuhr; Jurgen Fryen, Kirchweyhe; Dietrich Neumann, Bruchhofen; Georg Pattberg, Stuhr; Udo Wieseke, Syke, all of Fed. Rep. of Germany

[73] Assignee: Vereinigte Flugtechnische Werke-Fokker GmbH, Bremen, Fed. Rep. of Germany

[21] Appl. No.: 785,585

[22] Filed: Apr. 7, 1977

[30] Foreign Application Priority Data

Apr. 8, 1976 [DE] Fed. Rep. of Germany ....... 2615306

[51] Int. Cl.² .............................................. G06F 3/05
[52] U.S. Cl. .................................................. 364/200
[58] Field of Search ...................... 364/200 MS File; 179/15 AP, 15 BV

[56] References Cited

U.S. PATENT DOCUMENTS

| | | | |
|---|---|---|---|
| 3,535,683 | 10/1970 | Woods et al. | 364/200 |
| 3,665,417 | 5/1972 | Low et al. | 364/200 |
| 3,700,820 | 10/1972 | Blasbalg et al. | 179/15 BV |
| 3,781,818 | 12/1973 | Pardoe et al. | 179/15 BV |
| 3,856,993 | 12/1974 | Closs et al. | 179/15 BV |
| 3,949,298 | 4/1976 | Boxall | 179/15 AP |
| 4,047,159 | 9/1977 | Boudry | 364/200 |

Primary Examiner—Harvey E. Springborn
Attorney, Agent, or Firm—Smyth, Pavitt, Siegemund, Jones & Martella

[57] ABSTRACT

A data acquisition system includes groups of transducers, a separate commutator for each group cyclically interrogates the transducers of the group. The resulting signal trains are separately decommutated and the data from each transducer group are stored in separate buffer systems. Each buffer system has a pair of buffers which alternate between reading and writing and a mask control selectively causes updating of the buffer content or copying from one into the other. A third buffer in each system is continuously updated. A formatting processor calls on all buffer pairs to assemble a PCM signal train in which the data from each transducer occur at least once in a cyclically repeated main frame. Buffer locations more frequently updated are called on more than once in the main frame. This processor is programmed to assemble the buffer addresses by counting up from starting addresses for a ROM that holds each buffer address once. Separate processors use the content of continuously updated buffers to close feedback loops.

18 Claims, 5 Drawing Figures

Fig. 4

BUFFERS 33a 1,2
OPERATIONS

FRAMES

| Operations | | S | a1 | a2 | a3 | a4 | a5 | b1 | c1 | d1 | e1 | f1 | f12 | f23 | f34 | Frame |
|---|---|---|---|---|---|---|---|---|---|---|---|---|---|---|---|---|
| u:a<br>d:b-f | → | S | a1 | a2 | a3 | a4 | a5 | b1 | c1 | d1 | e1 | f1 | f12 | f23 | f34 | 1. |
| u:a+b | → | | | | | | | b2 | c2 | d2 | e2 | f2 | f13 | f24 | f35 | 2. |
| u:a+c<br>d:b | → | | | | | | | 1 | c3 | d3 | e3 | f3 | · | · | · | 3. |
| u:a+b+e<br>d:c | → | | | | | | | 2 | 1 | d4 | e4 | f4 | · | · | · | 4. |
| u:a<br>d:b+e | → | | | | | | | 1 | 2 | d5 | 1 | f5 | · | · | · | 5. |
| u:a+b<br>+c+d | → | | | | | | | 2 | 3 | d6 | 2 | f6 | · | · | f39 | 6. |
| u:a<br>d:b+c+d | → | | | | | | | 1 | 1 | 1 | 3 | f7 | f18 | f29 | f40 | 7. |
| u:a+b<br>+e | → | | | | | | | 2 | 2 | 2 | 4 | f8 | · | · | · | 8. |
| u:a+c<br>d:b+e | → | | | | | | | 1 | 3 | 3 | 1 | f9 | · | · | · | 9. |
| u:a+b<br>d:c | → | | | | | | | 2 | 1 | 4 | 2 | f10 | · | · | · | 10. |
| u:a<br>d:b | → | | | | | | | 1 | 2 | 5 | 3 | f11 | f22 | f33 | f44 | 11. |
| u:a-f | → | S | a1 | a2 | a3 | a4 | a5 | b2 | c3 | d6 | e4 | ZZ | ZZ | ZZ | S̄ | 12. |

PCM MAIN FRAME

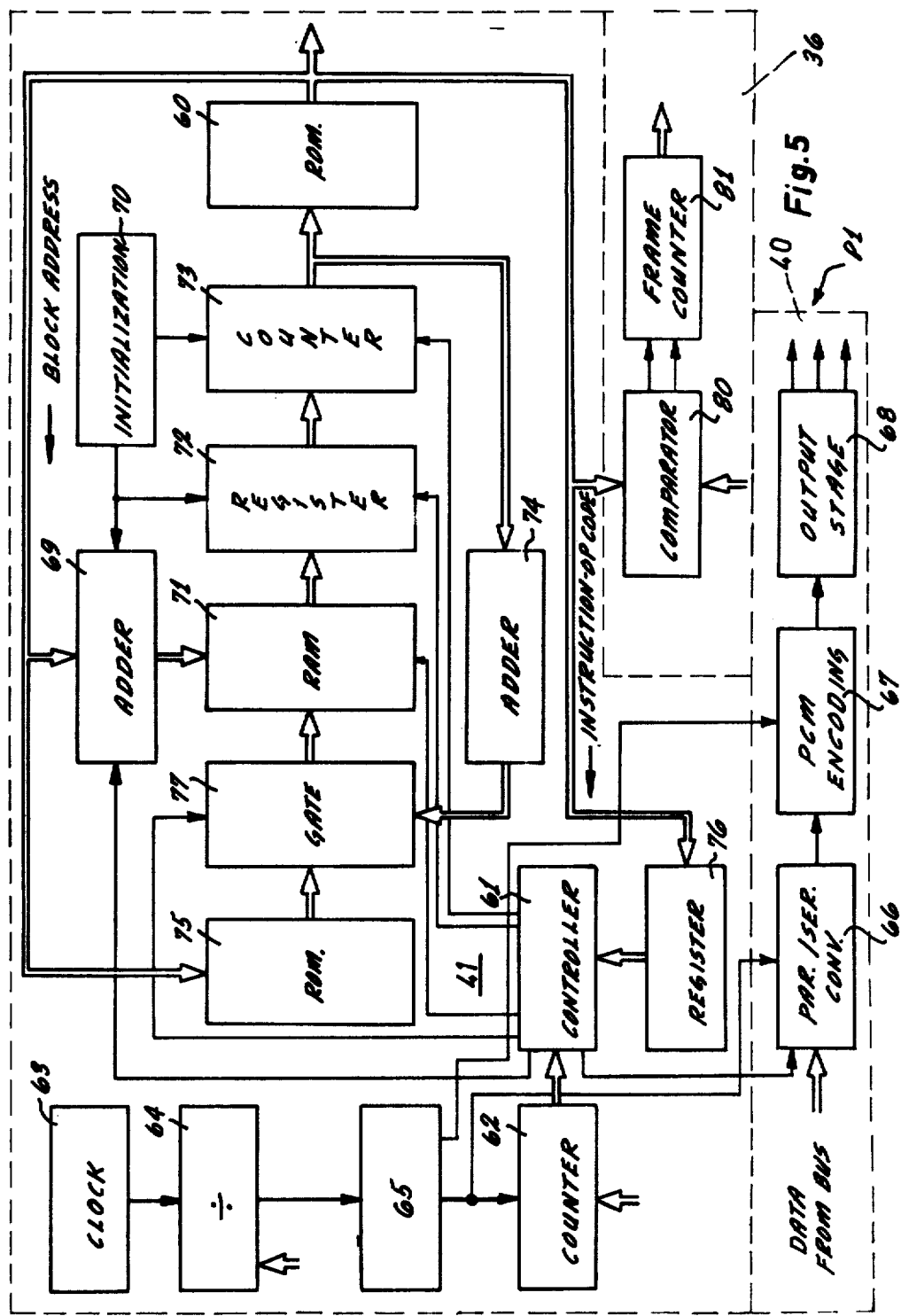

DATA ACQUISITION FROM MULTIPLE SOURCES

BACKGROUND OF THE INVENTION

The present invention relates to the acquisition and processing of measuring data from a group of measuring points (transducers).

Process control requires the plurality of transducers which detect and/or measure specific quantities such as temperature, pressure, flow rates, etc., to be placed in specific locations, and these transducers provide electrical signals representative of these quantities. All these signals must be fed to a suitable signal processing device, for example, a computer facility or the like. It is common practice here to use PCM transmission of the measuring signals to the processing device.

Each signal as generated in a transducer is usually analog-processed at first, such as amplification, normalization, filtering, etc., whereupon the preprocessed signal is digitalized. The digital signals are then transmitted via a common channel and in PCM format to the processor for storage at first and subsequent use.

It is apparent that the initial transducer pickup is, in many instances, a continuous one and if discontinuous this immediate generation of data overlaps usually at random with the operation of the other transducers. Accordingly, the acquisition process requires a certain ordering and sequencing simply because the processor is not in a position to acquire these data completely at random and in complete disregard of overlap.

It is known here to use commutator type interrogation units, being associated with the measuring transducers for cyclically interrogating them. This intermittent, i.e., cyclical interrogation process presupposes that the measurements undertaken by transducer does not change significantly in between sequential interrogations of the same transducer. The interrogation cycle, therefore, must be shorter than the fastest expected data change that must not be missed. This however, means that other transducers are caused to furnish data needlessly frequently. One has, therefore, used several commutators which interrogated different transducers at different frequencies. In cases the commutators are even controlled by a computer as to the specific interrogation instances. In any event, such a system becomes quite complicated and, therefore, is not suitable for many kinds of systems.

Data acquisition systems often cover a wide area as to the distribution of the location of the several transducers. In other words, many of the transducers are far apart from each other and from the central acquisition unit. Attempts to decentralize have been made in that data are preliminarily acquired and then fed via a multilined data bus to the central processing station. Such a system as a whole requires a high degree of synchronization of its component or subsystems to insure an orderly and timely flow of data to the central station.

Such a system, however, is not suitable, for example, in aircraft or space vehicles because of space and weight limitations. Moreover, aircraft systems are often subject to restrictive rules, so-called MIL rules, requiring, for example, particular serial data paths between subsystems.

The previously mentioned serially interconnected and decentralized data acquisition system has to work with a high degree of redundency of the information with respect to the several signal paths. This is particularly so because the control information needed in such a system actually reduces the transmission of data per unit time, particularly if the several components are to be accessed basically in a random fashion. Furthermore, such a system is quite extensive as far as the required timing in the serial data bus system and as far as information processing in each subsystem is concerned. There exist systems which exhibit from a system's point of view an optimum in the data acquisition and operation system, but they are deemed excessively expensive and are therefore unsatisfactory.

DESCRIPTION OF THE INVENTION

It is an object of the present invention to provide a new and improved data acquisition system which is of simple construction.

In accordance with the preferred embodiment, the transducers are divided into groups and each group is serviced by a high speed commutator, the several commutators operating asynchronously with respect to each other. The resulting PCM data streams are transmitted to decommutators for separating the data and storing them in buffer systems, also operating independently from each other. Among other tasks, the buffer systems organize the data so that some locations are more frequently updated than others. The updating and other storage is carried out autonomously by each buffer system, but the updating is organized in patterns and the patterns are changed in sequential assembly or frame periods. The metering and timing of these frame periods is centrally controlled by processor means, which call on the various buffer systems for data withdrawal on the basis of these frames. Several frames together constitute a PCM main frame in which all data as acquired are withdrawn whereby those data buffer locations which have been more frequently updated are called on more than once. Due to the high degree of autonomy of the several subsystems (each including a transducer group, a commutator, a decommutator and a buffer system) and of the data collecting processor, very little additional information has to be transmitted between them. The processor has mainly two tasks. It has to identify the frame periods so that the buffer systems can adjust their respective masking patterns for the selective updating. In addition, the processor provides a timed sequence of buffer addresses and the respectively addressed buffer system applies the data word from the accessed location into a common bus.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 illustrates the PCM frame format used within the inventive system; and

FIG. 5 illustrates a block diagram of the PCM processor.

Proceeding now to the detailed description of the drawings, FIG. 1 illustrates a central station or a central PCM processor system which communicates in this particular example with 3 PCM commutators such as 11, 12, and 13. Each of these PCM commutators services a plurality of transducers such as the transducers 11a, 11b, etc. for commutator 11 and collectively designated M1. Transducers 12a, 12b, etc. are collectively designated M2 and are serviced by commutator 12, and transducers 13a, 13b, etc., are collectively designated as group M3 and are serviced by commutator 13. The number of commutators as well as the number of transducers serviced by each of the commutators is shown here by way of example only. Later in this specification we shall refer to the more generalized case of n- groups and commutators.

Figure 1:
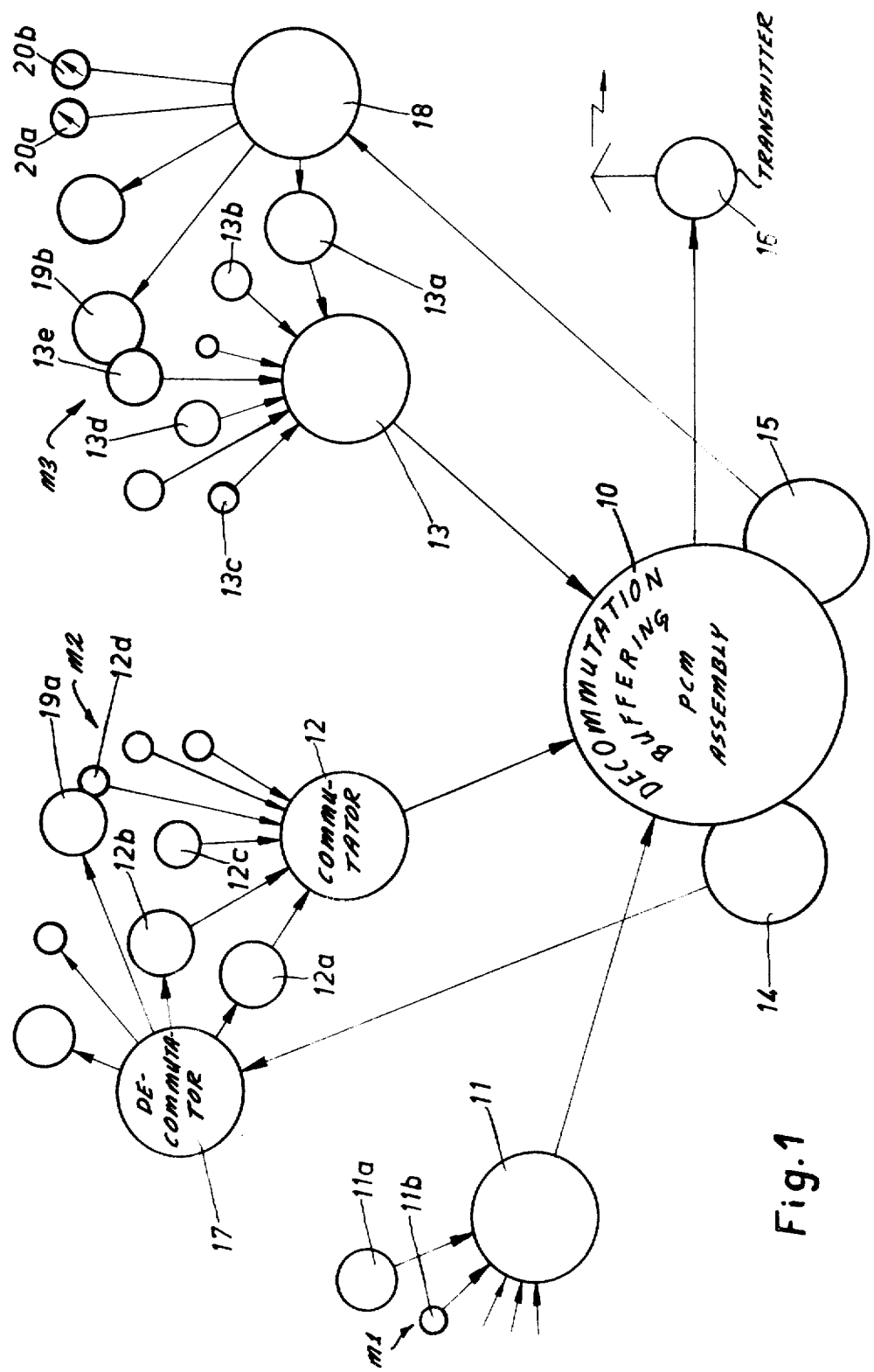
FIG. 1 is a schematic overview of representative measuring data acquisition system in accordance with the preferred embodiment of the present invention.

It may be assumed further that each of the transducers 11a, etc. includes a preamplifier. Also, in each link between the transducer and the respectively associated commutator there must be further amplifiers, level adaptors, filters, etc. It is optional where to place these units, i.e., whether to place them in the vicinity of the commutator as part of the immediate input circuit thereof, or whether to include it in the equipment of the transducer and its immediate environment.

The commutators 11, 12, and 13 each include a digitizer PCM stage for feeding the digital data to the processor system 10 as a continuous stream of bits. The central processor system decommutates the information to obtain a valid assignment and association between data and identifiable measuring points. Reference numerals 14 and 15 refer to further digital processing facilities for the data as so received and included in that processor system. They are, in effect, output devices which in turn cooperate with external decommutators 17 and 18, which for example, control and feed respectively adjusting elements such being in turn supervised or directly associated with transducers.

For example, it is assumed that 19a represents a particular adjusting element whose position is continuously monitored by the transducer 12d. Therefore it can be seen that in this particular system a loop is included leading from transducer 12d via the commutator 12 to the central processor system 10, the output device 14 of the system, the decommutator 17 and back to the adjusting element 19a. The situation is similar with regard to the output device and adjustment element 19d as serviced by the decommutator 18 and being supervised by the transducer 13e which pertains to the group of transducers serviced by the commutator 13. The situation is similar in other cases. The particular output device 15 is assumed to control reading instruments and provides, on a time-sharing basis, read-out signals for instruments such as 20a and 20b, for example via this particular decommutator 18.

Another output function performed and extractable from the processor system 10 is the further transmission of data, for example through a telecommunicating transmitter 16 which receives PCM data as they have been digitally preprocessed, sorted, assembled, etc. by the processor system 10 for purposes of transmission to a different location where they will be used further. The system as a whole may be the control system of an aircraft or of a space vehicle, and 16 transmits a stream of digital data in the form of a PCM signal to a ground station.

Figure 2:
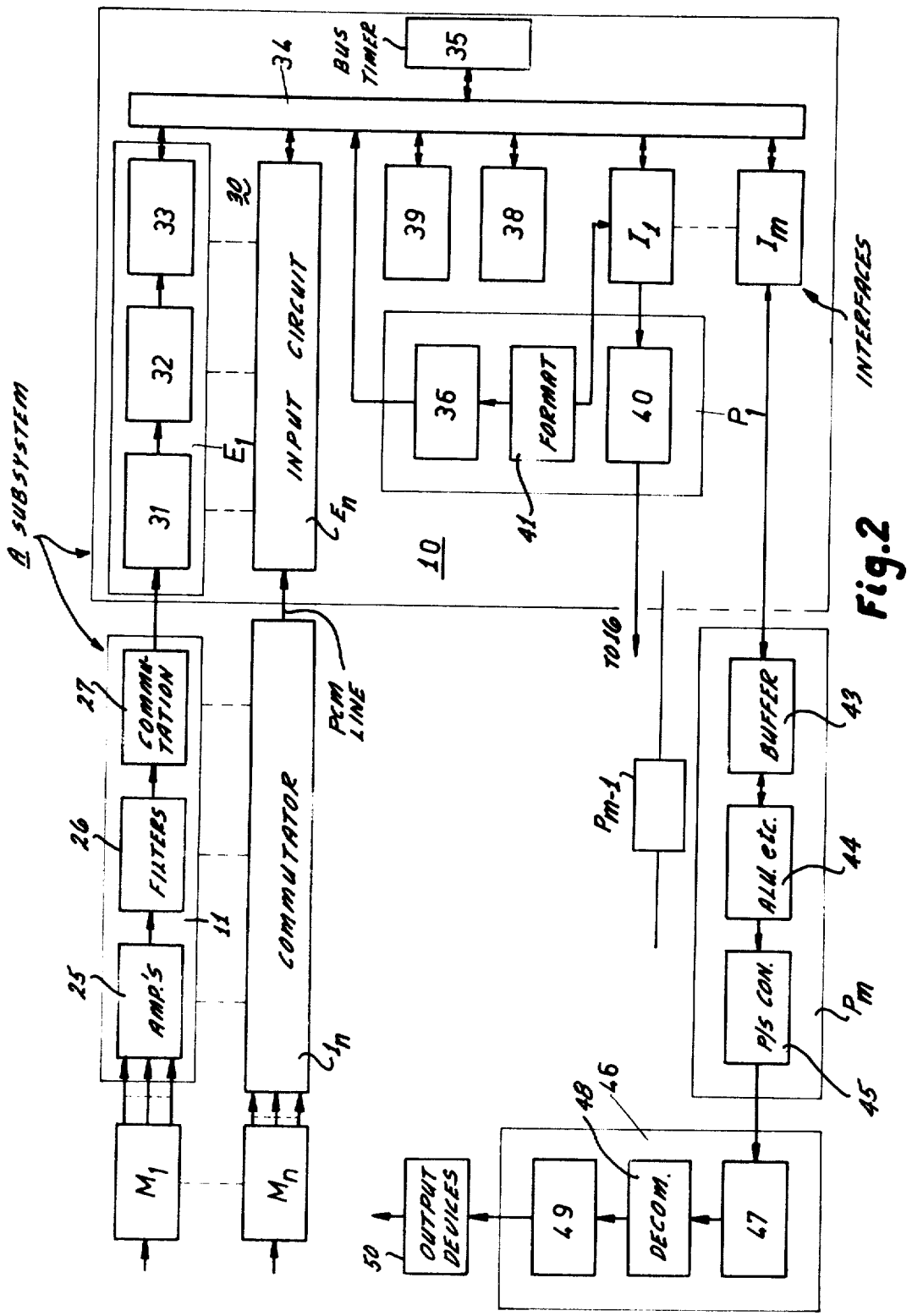
FIG. 2 is a block diagram of a generalized version of such a system showing, however, certain aspects in greater detail.

Turning now to FIG. 2, the system shows schematically groups of measuring points and transducers but on a more generalized basis. The groups of measuring points and transducers are denoted here collectively by the reference characters M1 through Mn; and it will be appreciated that FIG. 1 illustrated an example in which n was 3. Each of these groups of measuring instruments is serviced by a PCM data acquisition commutator 11 to 1n. These commutators are similarly constructed but they are independent from each other, i.e. they operate asynchronously with respect to each other and have a very high degree of autonomy. The number of transducers, i.e. measuring channels per commutator may be different, so can be commutator cycle frequency.

For each of the transducer channels the respective commutator circuit includes a suitable amplifier and the groups of amplifiers needed here are collectively denoted by reference number 25 shown specifically for the decommutator 11. The other commutators, of course, have similar such amplifiers. Each such amplifier provides the respective transducer input at a more suitable level and compensates signal line attenuation. Also, the amplifier includes in most instances signal level adaption, impedance matching, etc., so that the several transducer signals are presented at a uniform level and within the same range.

The outputs of the amplifiers are fed through suitable filter stages 26 in order to adapt the system to the bandpass characteristics as it is being given by the commutator cycle frequency and eliminates that frequency. The resulting multi-channel output as so preprocessed in each of the commutators in the several units 11 through 1m, is autonomously and cyclically interrogated as to the several measuring channels (27). The output circuit of each such commutator proper 27 includes a digitizer, and the output signals of the unit 11 through 1n are concatenated to obtain, in fact, a PCM signal train.

The PCM signals are fed by a separate signal line or channels as to each commutator to the processor system 10 and here, particularly to a portion denoted in the following, the input system 30. The system 30 includes a corresponding number of receiver and input circuits, being denoted E1 through En respectively for each of these PCM-commutator channels. Each input circuit includes in particular a synchronizing stage 31 which extracts a bit clock rate signal as well as a data word clock signal and a commutator cycle signal from the incoming PCM train because the commutators run autonomously and asynchronously as to any system's clock of the processors in system 10.

Each input circuit includes, in addition, a decommutator 32 which responds to the extracted synchronizing signals and distributes the data into a buffer 33 in an operation which will be described more fully below. Bit, word and commutator cycle synchronization as provided by the stage 31 is generally known; one may use here devices as disclosed, for example in printed German patent application No. P2321268, or No. P2462087. The construction, however, of these synchronizers is of a conventional nature. Briefly, the PCM signal will be of the self-clocking variety, and if of the length of each data word (number of bits defining a transducer output signal) is constant; word formatting and cycle rate detection is a simple counting process. It may be advisable however, to operate the commutators to insert a leading marker (e.g., a particular bit combination) in the beginning of each commutator cycle, and its detection is part of the task performed by device 31. The construction of the buffer 33 will be explained later and with reference to FIG. 3.

All buffers 33 of the input circuits E1 through En are connected to bus 34 which includes data lines, control lines and address lines. However, data and address lines may be shared, in that during particular periods address signals are transmitted via the data lines to the buffers, and the content of the addressed location is subsequently set into the same lines. A frame counter 38 is also connected to the bus to monitor continuously the passage of complete data frames. The counter 38 will in particular respond to addresses on the address bus, which addresses are not implemented in the buffers so that data are not forthcoming. Instead, the device 38 will access a marking stage 39, being, e.g., a ROM to extract therefrom particular marking codes which take the place of data and constitute particular format demarcations. Stage 39 is connected to the bus 34 and applies the markings thereto in lieu of data words whenever called for.

In addition to the foregoing, a plurality of interface devices I1 through IM are connected to the data bus 34 respectively providing interface connection between the bus and processors P1 through PM. The processors are individually connectable to the data and control line bus 34 which means that each processor can communicate with the buffers of the several input circuits. The double arrow connections to the bus indicate particuarly that control signals flow into the control line portion of the bus in two directions as to all units connected to the bus. The data flow however, is from the buffers 33 to the several interface devices. A timing unit 35 is provided to grant each processor particular periods of time of access to the bus and to the buffers. Unit 35 may include a priority interrupt system to override, e.g. a regular sequence. As will be developed below, processor P1 requires access on a regular basis, given by the word rate for assembly and transmission of the PCM signal train, which means a particular access slot per word period. The other processors have access for the remaining period and to the extent their tasks demands it which can be cyclical or on a priority basis.

The processors are constructed for the performance of certain tasks; two specific types of tasks are to be carried out, and it is assumed that at least one processor is particularly constructed to fulfill a particular task. The number of processors needed for each task depends on the size of the system as a whole.

The processor P1 (and possibly others) is the principle PCM frame assembly processor. It includes a parallel-to-serial converter 40 which extracts from the data bus, via interface I1, the parallel by bit data words and converts them into a serial PCM signal train for further use, storage and particularly for transmission by the transmitter 16 in FIG. 1. This particular output can also be regarded as a main output of this acquisition system. The data are assembled as serial bit train from data words extracted from the buffers periodically and during those periods in which the processor P1 has access to bus 34. Processor 1 assembles a sequence of data words in accordance with a program the processor executes. Accordingly, the processor P1 includes a format generator 41 which will be described in detail with reference to FIG. 5.

Briefly, the format generator 41 controls the interface I1 so that a buffer address is applied to the bus 34, and the buffer data soon to appear on the bus are caused by the interface to be fed to converter 40. In addition, the format generator controls the circuit 36 to control the timing of a selective masking control in all buffers. The other processors, one of which being illustrated in expanded form, Pm, are provided for providing for external control and particularly for the computations needed for such a control as well as for providing signals that can be used in meters or indicators. The particular processor Pm is, therefore, a representative example for the devices 14 and 15 in FIG. 1.

The interface Im of the processor Pm is of course also connected to the bus 34 and the control unit 35 times the access to the bus. The interface Im feeds an input buffer 43 which is one of the main RAM's of this particular processor. The Block 44 denotes the processor proper, i.e., it is a combination of ALU, program ROMs, accumulator:register instruction and index registers, program counter and additional RAM devices. Reference numeral 45 refers to a parallel-to-serial format converter producing a stream of bits as output signals for this particular processor.

The unit 46 to which this particular processor Pm feeds its output has again a bit clock and frame synchronizer 47 feeding a decommutator 48. The decommutator may have, as an input device, a digital-to-analog converter so that it provides analog signals into its individual output channels. Reference numeral 49 represents collectively a plurality of analog signal amplifiers, signal level adaptors, filters, etc. which are needed in the individual output channels as each channel may control a very different device. These devices are collectively denoted in FIG. 2 with reference numeral 50 and by way of example they include the devices such as 19a, 19b, 20a, 20b, etc., in FIG. 1; in other words, the device 50 includes adjusting elements, control elements, possibly motor driven devices, indicators, readers, instruments, etc.

As will be recalled the several devices or some of these devices being included in the group 50 are intermittently or continuously monitored by transducers included in the groups M1 through Mn.

Before proceeding to the more detailed description of the system, it should be noted that, in general, the inventive data acquisition and processing system operates with fast operating data buffering and fast data processing on the basis of direct access to the buffers without interruption of individual program routines that assemble the data in a particular format. The inventive system realizes this concept fully. Basically, each group of peripheral data acquisition subsystems, i.e., each commutator is associated in the central system with a dedicated data receiving and decommutation device which includes further bit clock and commutation cycle synchronizers and decommutation proper. Each such peripheral subsystems is also associated with a buffer system such as 33.

All of the several processors (m) have access, i.e., direct access via the data bus to these buffers. As will be explained in detail below, each of the buffer systems 33 operates with internal, autonomous reading and writing cycles and routines, which in effect, permits concurrent or intermittent recording (storing) of newly acquired data, interspersed or even overlapping with read-out for further processing. These several autonomous buffers operate, so to speak, in parallel so that a quasi-concurrent group of information is available for such further processing.

Each of the commutators 11 through 1n scans the respective associated transducers sequentially, at maximum possible speed. Actually under such circumstances strict concurrency is not available. On the other hand, so-called sample and hold devices could be provided for, but it was found that the parallel operation of several asynchronously operating high speed commutators amounts to almost quasi-concurrency in the acquisition of data. This is particularly so if one considers that the time difference between a true, current measuring data value and the "oldest" data value previously acquired can be not larger than twice the slowest (largest) commutator cycle period. As long as any transducer output does not change within that period by more than the needed resolution (amplitude), true concurrency in the acquisition is indeed sufficiently approximated. The number of commutator-decommutator subsystems will be selected accordingly.

Figure 3:
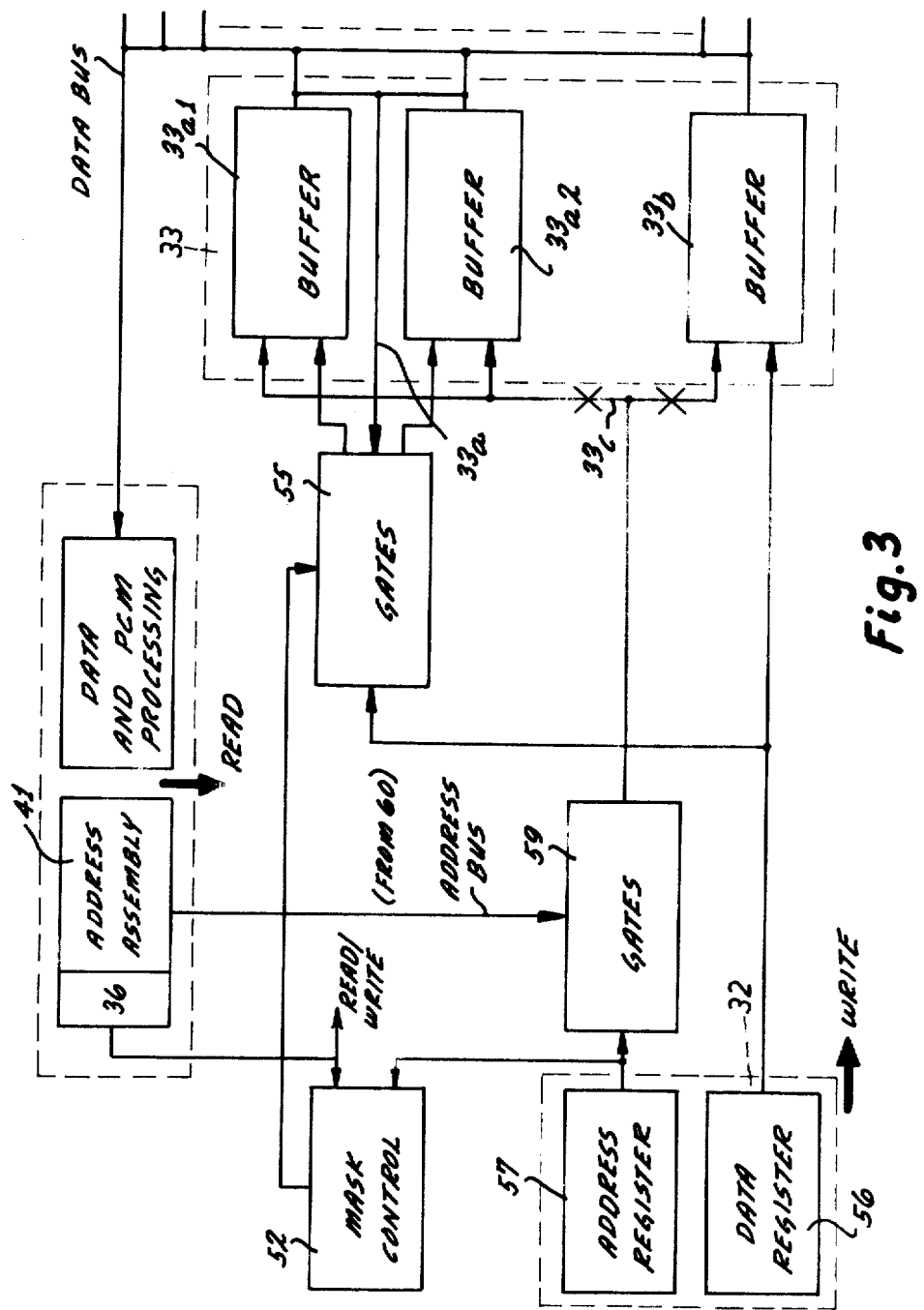
FIG. 3 is a block diagram of a buffer with associated circuitry and used in the plurality in the system shown in FIGS. 1 and 2.

Proceeding now to the description of FIG. 3, it illustrates in a somewhat simplified manner the construction of a buffer 33 or, more precisely, of a buffer system 33 and its immediate control. Such a buffer assembly is of course provided in each of the input circuits E1 through En. Each buffer system 33 includes a set of twin buffers 33a1 and 33a2 as well as another buffer, 33b. Each of the buffers 33a1, 33a2, and 33b has access to the data bus 34 and as stated above, all processors P1 through Pm may communicate with any of the buffers. This being the general case, the system actually works in a more restricted fashion. The twin buffers 33a1,2 will be accessed by processor P1, and the other processors may access only buffer 33b.

FIG. 3 shows also the decommutator 32 of the particular input circuit. The decommutator 32 includes a particular register 56 for data to be stored in a particular buffer location. The register can be assumed to receive a data word from a serial to parallel converter which assembles the bits of a data word from the respective commutator. That data word represents in each instant a particular measuring value extracted from a particular transducer. The decommutator action of 32 results in the reassembly of a particular data word under the operation of the synchronizer 31 (FIG. 2) and at the end of each such assembly period (being equal to the commutator cycle period divided by the number transducers serviced by the commutator) the assembled bits are clocked in parallel into register 56.

The decommutation includes, in addition, the association of the content of register 56 with a particular identifying address. That address is contained in a register 57 being updated by the bit, word and cycle synchronizer 31 of the particular input circuit and may, for example, be a counter which recycles upon completion of each scanning and commutator cycle of that particular decommutator-commutator subsystem. Decommutation, therefore, involves generally the changing of the address content of register 57 so that the data word currently held in register 56 can be reassociated with the particular measuring point in which the data word originated.

The register 56 has its output connected directly to the data input bus of the buffer 33b. The address held in register 57 to is fed to a particular addressing bus 33c to which the buffer 33b is also connected. That address bus, 33c, is common to the buffer system 33 as a whole, so that the same address is being applied also to the addressing inputs of buffers 33a1 and 33a2.

It can thus be seen that all data as they are being received in this particular acquisition subsystem, comprised of one commutator and one decommutator, are sequentially set into that particular one buffer 33b which is cycled through as far as addressing is concerned at the rate determined by the commutation and decommutation process. Therefore in any instant the data as they are being acquired are available in that particular buffer 33b. On the other hand, buffer 33b is updated at the cycle rate of the commutation-decommutation operation so that the content is held in any particular location of buffer 33b only for a duration equal to the cycle period of the commutation-decommutation process; data is not being saved by this particular buffer 33b. The saving of data beyond the commutation-decommutation period is provided for in the twin buffer 33a1,2.

It is important to realize that a read/write cycle of the buffers is faster (shorter) than the data rate from register 56. Thus, following a write cycle, the buffer system operates in at least one, possibly several read cycles, and in these read cycles other addresses are applied to the buffer address bus 33c. These addresses flow through the address bus portion of bus 34 (or through the data bus if that bus is operated alternatingly for transmitting address signals or data). These address signals originate in any of the processors P1 through Pm and include a subsystem address (e.g. high order bits and a buffer address). The device 59 responds to the sybsystem address to which it pertains if in fact the particular processor wishes to extract data from the particular buffer system 33. The response amounts to a blocking of the connection to the decommutation-addressing register 57 and replacing the address by the buffer address also furnished by the particular processor. That address is applied to bus 33c to effect read out of the thus accessed location. However, control signals accompanying that address will cause addressing only of buffer 33b when one of the processors other that P1 is the requesting one, while any access request from PCM assembly processor P1 for read out is applied only to the twin buffers 33a1,2.

The data content of register 56 is also applied to the buffers ×a1, 33a2, but via switching and gating stage 55, which selectively suppresses and permits passage of the data as they can be derived in any instant from the register 56. It should be noted that the switching stage 55 has a second data input being the separately bussed together outputs of the two buffers 33a1, and 33a2. This internal bus, 33d, therefore, holds in any instant data as they are being read out from one of the twin buffers to be set into the same location of the respective other twin buffer.

It should be noted that the output of the data output of the gating network 55 is any instant applied to the data input of both of the twin buffers but in any instant only one of these twin buffers operates in the write mode while the other operates in the read mode. This aspect should be particularized because it was stated that the buffer system either reads (addressing from a processor) or writes (addressing from the decommutator 32). This is true without any qualification for buffer 33b. As far as the twin buffers is concerned, it requires a modification. For periods of time to be defined more fully below, one buffer of the twin set reads always unless reading is selectively suppressed, while the other buffer writes if in fact writing is required of the buffer system as a whole, while that other buffer simply idles when reading is required of the buffer system as a whole.

Duriing buffer work cycles, when fresh data from the decommutator 32 are to be stored, the content of the twin buffer is selectively updated. The content of register 56 is either written into or replaces the content of the particular, currently addressed (57) location of that one of the twin buffers currently operqting in the write mode. Alternatively, the address from register 57 as applied to both buffers 33a1,2 causes the content of the location having that address in the buffer operating in the read mode to be applied to buffer bus 33d, and that data word is written into the location having the same address but being located in the other one of the twin buffers. The content of the register 56 is suppressed by stage 55 as far as writing it into either of the twin buffers 33a1,2 is concerned. This operation permits relocating the content of any buffer location in the twin set of buffers. It should be noted that during any commutator cycle the content of only one (or more) of the locations having similar address, or addresses, in the twin buffers are updated, because only one buffer is in the write mode. The just described relocating procedure now causes that same data word to be written into the location of that buffer which previously was in read mode. The alternation between read and write modes of the two buffers will be described later.

The particular stage 55 selectively controls the updating or the recycling (copying) of data and thus provides fr selective masking of the buffers 33a1 and 33a2 in regard to updating. In other words, gate structure 55 either couples bus 33d to the data-in lines of that one of the twin buffers 33a1,2 which is currently in the write mode, or 55 couples the output or register 56 to these data-in lines, or 55 blocks any data flow for writing into either of the twin buffers. This blocking is optional as will be described shortly.

The gating stage 55 is controlled by a stage 52 which is, in a general sense, under control of the processor in that the processor times the selectivity of updating or masking and recycling of the data for purposes of generating a particular format in the twin buffers 33a1,2 as will be explained later with reference to FIG. 4.

Presently it is pointed out, that stage 52 operates as follows. The stage receives count numbers from 1 to 12 in cyclic repetition from the stage 36 in processor P1. These count numbers may come over the data lines on a sharing basis as controlled by 35 (FIG. 2). The count numbers represent so-called PCM frames, to be explained in detail shortly. Presently it is merely stated that the periods representing such frames are longer than the (or any) commutator cycle period. There is no time or phase relationship between these cycle periods and the frame periods. The frame periods are defined, as far as a buffer system-decommutation-commutation subsystem is concerned, by the sequence of updating of these count numbers, in the following called frame count numbers which serve as addressing signals in stage 52. These addressing signals enable one out of twelve different address decoders. These address decoders can also be understood as being of the type used sometimes as address-present-and-implemented devices in memory ports. The addresses to be decoded are those derived from decommutation register 57. For each buffer address that is applid to stage 52 the particular set of decoders then enabled and accessed by the particular frame count number, a threefold decision is made: (1) is the data word from register 56 to be fed to the currently accessed location, in that one of the twin buffers which is in the write mode or (2) is the currently read out word from the respective other buffer to be copied into the write-accessed location, or (3) is the data word to be suppressed.

In addition the least significant bit of the frame count number is used to control the read and write mode alternation, e.g. for odd frame count numbers buffer 33a1 reads and 33a2 writes; for even numbers the modes are reversed.

It can be seen that in any instant a particular masking control for this particular buffer system is provided in that the circuit 52 compares the addresses as they are supplied from the decommutating register 57 with those buffer addresses stored in some fashion in stage 52, to control whether or not to permit updating of the content of the particular buffer location of that one of the twin buffers which in that instant operates in the write mode. Whenever updating is not permitted the content of that location bweing read out at that time from the respective other buffer is recycled through the gating stage 55, or no writing at all takes place.

It can thus be seen that the bufer 32b is actually continuously supplied with measuring data extracted from one of the groups of transducers by a commutator and decommutated in 32 of the respectively associated input circuit. Thus, this particular buffer 32b holds quasi-current measuring values. These data are updated here as fast as the respective commutator supplies them as to each measuring point. The twin buffers 32a1,2 are selectively controlled as to their input, whereby selectively data are copied or extracted from the stream as supplied by the commutator-decommutator acquisition subsystem. This way one produces an over-commutated PCM format that permits quasi-concurrent acquisition in the subsequent processing. The main PCM frame is composed of the twelve frames. During any frame any particular transducer-commutator-decommutator-buffer subsystem updates some, all or none of the data words in the respective twin buffers whereby the rule is that any data word location that was updated during a frame period, will be copied during the next frame period into the location having the samme address in the respective other one of the twin buffers unless updating is to be carried out once per frame period. It can thus be seen, that within a main frame period (composed of twelve sequential frame periods as individually identified by count numbers) some locations in 33a1,2 are over-commutated in the sense that their content are updated more then once during a main frame period. If a location is updated during each frame period, there will be a twelvefold over-commutation accordingly. Some locations may be updated only once during a main frame period, i.e., only once during one frame period. This, however, is true only as far as the twin buffers is concerned. The buffer 33b is continuously updated at commutator cycle rate.

The foregoing aspects are particularly important because they are the same for other groups of transducers being also associated with such a buffer triplet 33. It should be noted that even though the several commutators operate at a high speed there is no strict concurrency of the data acquisition as was mentioned earlier. Sample and hold circuits if used would insure a high degree of concurrency. However, the parallel operation of the several asynchronously operating commutators exhibits as a worst case a time difference between first and last measurement of not more than twice the slowest commutator cycle rate. Thus, even without sample and hold devices the inventive method uses high speed commutation and sampling and does produce a quasi-concurrency of data acquisition, assuming that even under worst case conditions the values measured do not change too much. The over-commutation exhibited by the buffer assemblies and their control insures that type of quasi-concurrency of the data acquisition processor, particularly because over-commutation may occur in several of the subsystems in parallel. The particular over-commutation for all of the twin buffers 33a1,2 of all subsystems has a significant advantage for further mathematical processing of the data, particularly as compared with over-commutation of data directly during the acquisition by the commutators. Presently all data acquired pursuant to concurring interogation and commutator cycles are acquired and actually stored in each frame. These data are available as soon as acquired which, for all subsystems together establishes quasi-concurrency in the acquisition. For it is, of course, required that data groups or blocks ultimately needed (as to updating) at similar frequencies as far as acquisition process is concerned, must originate during the same commutator frame. They should, therefore, be readable from either of the two buffers of each of the twin set. Moreover, they should originate within the same frame period, which is the reason that the same frame count number as provided by formatting processor P1 is applied to all input circuits E1 to En and particularly to all of the respective stages 52 thereof. This is the basis for quasi-concurrency particularly if mathematical operations are involved in the utilization of the thus assembled data. The alternating operation betwen two buffers adds further immediacy to the availability of properly framed data in each instant.

FIG. 4 shows an example of an over-commutated PCM format to be produced by means of PCM processor (P1) control. The processor P1 is designed (as will be explained with reference to FIG. 5), to generate a PCM signal train which consists of a continuous stream of words. The processor P1 assembles these words; the array depicted in FIG. 4 defines all of the data words being included in that PCM data stream. They will be derived from all of the various buffers and here particularly from the respective sets of twin buffers.

The PCM frame as a whole has 12 frames as shown in rows in FIG. 4. The 14 columns denote 14 different words as pertaining to each frame. That means, that during any single frame, fourteen different data words are assembled, e.g., in sequence of ascending column and position order, and the assembly of the main PCM frame amounts to a sequential assembly of all twelve such frames, also for instance in sequence of ascending row numbers which are, of course, the frame count numbers alluded to above. It is repeated, that each frame period (being equal to the period it takes to transmit fourteen data words out of the system) is longer than any commutator cycle period.

The particular frame format assumes by way of example, that the transducer system as a whole has transucers which provide the following different data words: a1 to a5, b1, b2, c1 to c3, d1 to d6, e1 to e4, and f1 to f44; these are altogether sixty-four transducers and data words. The association of these sixty-four transducers with the various different commutator-decommutator-buffer subsystems is arbitrary. The grouping made here is based solely on frequency of occurance of the measuring values and data words. Thus, the group of FIGS. a1 to a5 is represented twelve times. That means data words a1 to a5 are actually transmitted in each frame. The group of signals b1 and b2 are represented six times, and it can be seen that b1 is assembled and transmitted with frame 1, 3, 5, etc. and b2 is assembled and transmitted in frame 2, 4, 6, etc .., c1, c2 and c3 is another group of transducers and measuring values, being only presented four times in the PCM main frame and the group f1 through f44 identify as a group the transducers and their measuring values which is not over-commutated and are transmitted only once per main frame. The heavy line denotes to its right and above that portion within the entire frame constituting the single presence of each transducer and its measuring value and data word. That in turn is an effective presentation of the storage space needed in the buffer system as a whole.

It is repeated, that the PCM signal to be assembled by the processor P1 constitutes a train of words in which each row (frame) is assembled and transmitted word by word, and the rows are transmitted in ascending order. Each frame begins with a code, designated S which is not in the buffer but introduced by 38/39 into the data stream as it is assembled on the data bus 34 (but in parallel by bit format on the bus). The last frame ends, in addition by three code words designated ZZ followed by the complement of S. As far as the assembly is concerned, take the situation in about the middle of the main frame. The last word of the sixth frame assembled is f39. Next comes the beginning-of-frame marker S, then each of the five data words a1 to a5, then b1, c1, e3, f7, f18, f19, f40, followed by the marker S identifying the beginning of row (frame) 8.

Having explained the overall format which the processor P1 assembles, it should not be explained, how the buffers 33a1,2 are actually loaded, updated, etc., because the processor P1 assembles the PCM main frame data out of the contents of all these twin buffers in all the input circuits E1 to En (each having a set of twin bufffers 33a1,2).

It should now be observed, that the updating of the contents of all the buffers proceeds during the various frame periods, and the duplication process is superimposed. As to each buffer, this will apply to whatever transducers are serviced by the respective commutator-decommutator-buffer subsystem. The updating and copying as it applies to each frame period is depicted along the left hand margin of the frame diagram in FIG. 4. This means, for example, that during the twelfths frame period, all buffer locations were updated, involving particularly all the various buffers 33a1. As the next main frame begins, each of the buffers 33a1 operates in the read mode while all buffers 33a2 operate in the write mode. Now, during the first frame period, the locations in all 33a2 buffers are updated as to the data group a1 through a5. The content of the locations for the group b1 through f44 is duplicated in that the respectively concurrently addressed contents for these words from the buffer 33a1 are copied into the locations of like addresses in buffers 33a2. It is repeated, that this occurs separately in the various subsystems, because the various transducers pertain to different groups M1 to Mn (FIG. 2). Also, it should be realized that in the general case, a group such as a1 to a6 does not necessarily belong to one and the same subsystem. The updating or copying is carried out only on those particular ones that belong to a subsystem. Thus, a particular subsystem and here particularly the twin buffers 33a1,2 thereof, may for example have storage space for one transducer of the a- block e.g., a3. This means that during the first frame period, gate 55 will permit the content of register 56 to be written into buffer 33a2 only when the register 57 holds the buffer address for a3. All other locations are presumed to belong to the other blocks (b through f), that means that for all other addresses as they will appear in register 57 the respective content drawn concurrently from buffer 33a1 are copied. The circuit 52 has responded to the frame count number 1 by commanding gate 55 to block all other data available in 56, except a3.

In the next or the second frame, 33a1 are switched into the write mode and the locations therein for the block a1 through a5 receive new data, so does the block of locations for b1 and b2. The remainder of the buffer contents is neither updated nor copied in the second frame period. During the next frame, which is the third frame period buffers 33a2 are again in the write mode and the content of the locations for all of the blocks a and c is reloaded while the b block is duplicated into 33a2. In the fourth frame period, the a, b, and e block is updated, the c block is duplicated and so forth. It can thus be seen that it is important that the two buffers 33a1 and 33a2 in each subsystem do in fact alter as far as reading and writing is concerned. In each of the subsystems there is a duplication routine in that from the buffer which previously was written into these data are now being copied into the buffer currently being written into, except that block a is updated during each frame and never copied. This way it is made sure that each of the twin buffers holds a complete set of data at the end of each frame. This duplication, of course, permits independent access for read-out from any of the buffers deemed current in any instant. In the twelfth frame all locations, a through f, are updated in one particular buffer (of all buffer systems) and in the next frame, which for reasons of cyclic repetition is of course the first frame of the next main frame, the content of the locations b through f are duplicated while of course the group a is updated. This then completes the cycle.

Before proceeding to the description of FIG. 5, the following general remarks are in order. The autonomously operating buffers update their content or copy it on the basis of the rules plotted along the left margin of the array of FIG. 4, using only the frame periods as reference as to what is to be copied and what is to updated. Processor P1 meters these frame periods, because the main task of processor P1 is to assemble the PCM data stream as per the format of FIG. 4 and on a frame by frame basis. P1 includes the necessary software and programming and operates in order to generate the necessary format as far as the presentation of data on the data bus 34 is concerned. It should be realized that the entire operation, including the specific processing of the acquired data runs in a real time environment which in effect amounts to a condition for a minimum flow of data in the serial PCM presentation of data wherever needed. Since computers very frequently reach rather rapidly their limit in a real time environment the rather involved operating system of a large computer system poses a constraint which does not permit shortening in overall process time. Therefore, the given flow of data, i.e., the data rate may well compel the use of hardwired programs which usually are faster than storage programs in a read/write environment. As it will be realized the present invention produces the PCM serial signal without multi-programming but by an optimized mini-processor (P1) which is very suitable from the point of view of real time environment. Multi-programming is particularly avoided by the use of autonomous buffer subsystems. The only requirement is, that the switching circuit 59 and memory access time permits intermittent addressing from the decommutator register 57 and from processor P1. The word rate from the decommutator outputs and the word rate in the PCM stream to be assembled must be sufficiently slower than the buffer access cycle period.

Also, of course, one dispenses with the operating system of a larger computer. As will be explained shortly for each PCM format one needs at the most four particular operating routines to be extended by P1. Another advantage which is explained and wil become more apparent below is that the data flow from the buffers and the conversion into a serial PCM stream can be carried out in parallel to the PCM formatting and assembly routines.

Turning now to FIG. 5, the format generation will now be explained in greater detail. The figure shows a ROM 60 whose content is a table of buffer addresses for the data. Theoretically, this table should correspond exactly to the sequence of the several words in the main PCM frame format up to the point of repetition. However, in the over-commutated PCM employed here, such an organization would lead rather quickly to a ROM of excessive size. Please note that FIG. 4 is not specifically representative of that point, as a full table would merely require twelve times fourteen buffer addresses to be called on in the illustrated sequence, but much larger systems render it inadvisable to store the full table in the ROM 60; instead the ROM contains each buffer address just once, and the repetition of access to locations such as those of the a- block (actually of all but the f-block) is program controlled. The processor P1 executes a program which is based on the periodicity in the smallest range of address sequencing. It should be mentioned, that each buffer system has its own address continuum. Thus, the addresses which ROM 60 sets into the bus 34 include an input circuit address (to identify that one of the circuits E1 to En whose buffer is to be accessed) and a buffer address for accessing one location in that one of the twin buffers which happens to be in the read mode.

The ROM format is organized in that the buffer addresses are stored therein in a block organization whereby each block pertains to a transducers to be scanned at similar rate. In other words, the ROM addresses for the locations of the buffer addresses of block a1 to a5, are consecutive numbers. The buffer addresses themselves of this block may vary widely, as the data may be in different input circuits and subsystems. The blocks follow each other, i.e., the ROM addresses follow each other in an order to descending occurrence rate in the PCM format. The f-indices have no relation to the ROM 60 address. The buffer address of f1, f12, f23, etc., are stored in consecutive ROM locations.

Since the PCM format (main frame) is assembled and generated by the PCM processor P1 the processor controls the access to the ROM and its content and the extraction of addresses needed in any instant on the basis of a program. In furtherance of this operation each ROM location, i.e., each buffer address as so stored, is additionally associated in the ROM with a particular operating code. This code insures proper process procedure in regard to finding the next buffer address to be accessed for purposes of generating the particular PCM format as per FIG. 4. As stated, a block of transducers and buffer locations within the currently used meaning are those buffer locations which are updated at the same rate and which have the same repetition rate in the PCM main frame format.

The locations a1 through a5 recur the most and are most frequently updated; the block f1 through f44 is updated only once per main frame and each respective data word occurs only once in the PCM main frame.

Each block of buffer addresses as stored in ROM 60 has a ROM starting address which, for example, are the ROM addresses for the locations in ROM 60 containing the buffer addresses for a1, b1, c1, d1, e1, and f1. These ROM starting addresses are contained in a ROM 75; in other words the block starting addresses of ROM 60 (which are access addresses of ROM 75) constitute the content of the several locations in ROM 75; addresses for access to ROM 75 are the buffer addresses as extractable from ROM 60. Thus, any buffer address which is outputted by and from ROM 60 and when applied to ROM 75 as address for access, causes ROM 75 to furnish the respective ROM 60 starting address of that block of buffer addresses to which the outputted buffer address pertains. For instance, if ROM 60 outputs the buffer address for buffer location f22, and if that address is applied to ROM 75, the latter ROM will furnish the address of ROM 60 which contains the content of buffer location f1.

These starting addresses for ROM 60 are extracted from ROM 75, assembled in a buffer 71 and used by the circuit to generate the needed addresses for obtaining a sequence of accesses to ROM 60 so that the needed sequence of buffer addresses can flow from the ROM 60, and the thus accessed buffer locations will furnish the corresponding data sequence. It is thus repeated that the assembly of the PCM main frame format is, thus, reduced to a programmed assembly of addresses for ROM 60. The processor P1 executes basically four types of operations in furtherance of that objective. These four types of operations are defined by the particular operating code that accompanies each buffer address and thus emerges with that address at the output of ROM 60. The code, of course, establishes the next step the processor is to undertake.

The four operations or micro programs are the following. (1) access the next ROM address in order and pertaining to the same address block; (2) jump to the ROM address of the next block in order, which may be the ROM starting address for that block or a ROM address for any other buffer address pertaining to that block. This operation is carried out only when the jump occurred from a buffer address that was not the last one of a block, so that, as a part of that micro program, the particular jump-off has to be "remembered"; (3) the same as (2) except that this will occur at a block end so that a saving of the address from which the jump occurred does not have to be carried out; instead the ROM 60 starting address of the block just completed is taken from 75 and fed to 71; (4) initialization by charging the read/write store 71 with ROM 60 starting addresses as defined. Considering now the circuit in FIG. 5 in some detail, the essential elements here, as far as operation is concerned is the ROM 60 and a controller 61. The processor as stated has a controller 61 which may be constructed as a ROM with sequential addressing of the internal ROM structure that contains the micro instructions. An address counter 62 provides for this accessing. The counter 62 is driven ultimately by a clock 63 of this processor. A countdown device 64 serves as a frequency or clock rate divider, and a switching device 65 permits adapting of the system to the needed timing requirements. It should be noted that the extraction rate of data from the buffer is proportional to the PCM signal or bit rate as ultimately outputted, multiplied by the number of bits per word. Device 65 thus adapts the processing rate to the needed data rate, i.e., the number of bits per words chosen. Once adjusted, device 65 can be thought of as part of the frequency division.

The controller 61, in addition, is accessed by operating or instruction codes held in the register 76. These operating or instruction codes initiate in each instance the execution of a micro program by the controller 61. These are the operating or instruction codes, that appear at the output of ROM 60 following each read out. Thus, the ROM 60 does not only contain all of the various buffer addresses but the entire program because each of these buffer addresses is associated with a particular operating code. That operating code upon being read out of an accessed location from the ROM 60, is set into the register 76 in order to obtain the respective associated micro processor routine.

The sequence of micro instructions thus initiated results, of course, from the updating of the content of the counter 62 following in each instance an initial entry into any of the four micro programs routines through the instruction register 76. Basically these four micro programs are the four routines outlined above, based on four different instructions or operating codes accordingly.

The particular buffer address extracted from the ROM 60 is fed to the address bus 34 for use by the respective input circuit to replace, via the circuit 59, the currently valid buffer address for purposes of asynchronous read out, interleafing with the addressing operation as controlled through the decommutation process (register 57).

The ROM 60 is accessed by a stepped counter-register 73 for particularly accessing and addressing the ROM location which contains the respective buffer addresses needed in sequence. 73 acts as a counter for read out of sequential ROM 60 addresses containing the buffer addresses of a block; 73 acts as a register for accessing any individual ROM location.

A store 71 stores all of these ROM 60 addresses which contain either the buffer addresses for the transducer a1, b1, c1, d1, e1, and f1, or those ROM 60 addresses for such buffer addresses of a group which would have been the next one to be accessed but for the jump to a different block. By way of example, in the beginning of the third frame store 71 holds the 60 ROM addresses for the buffer addresses for data word locations a1, b1, c3, d3, e3, and f3. During that third frame period these ROM addresses are sequentially fed from store 71 to register 72 for temporary storage and from there to counter/register 73.

As long as the locations called on pertain to buffer addresses of the same block, and there is still at least one more buffer address of that same block ahead, the respective buffer address read-out from ROM 60 will be accompanied by a micro program 1 code. That operation code when set into register 76 will cause the counter 73 to be incremented by "one" for each access step. For example, a1, a2, a3 and a4 are all accompanied by that routine 1 operation code, to that one ROM 60 address after the other is accessed until reaching the ROM address for the a5 buffer address causing the latter to emerge together with a jump instruction at block end (routine 3-supra) whereupon the register counter 73 is loaded from store 71 with the ROM 60 address for the b1 buffer address, etc. The micro program 3 will be described in greater detail below.

Whenever during a frame a jump is called for without prior completion of the current block (micro program 2) the counter 73 is not increment but its content is incremented by "one" in an adder 74, and the resulting ROM 60 address defining the ROM 60 loction of a buffer address that will be called on in another frame, is passed through a gate structure 77 to replace the particular ROM 60 address in store 71 associated with the same block. This way the return to the right place of that block is assured.

By way of example, during frame 4 counter/register 73 will extract from the ROM 60, for example, the address for the buffer location d4, that buffer address may have just been read out of ROM 60. The associated instruction calls for a routing 2 which requires saving because block d has not been completed and the next buffer address to be called on is in block 3, namely the ROM 60 address for e4. Thus, the adder 74 adds "1" to the ROM address held in 73 which defines the access code for d5. The PCM sequence requires calling on the d5 buffer address later, during frame 5. Hence, the ROM 60 address for the location that holds the buffer address for the d5 transducer output word is passed from adder 74 via gate 77 to the store 71.

Proper access to store 71 is insured via a decode and selective incrementing stage 69. The stage 69 decodes the current block address as it is derivable from the output lines of ROM 60, holding the buffer address d4. The decoding results in a particular access to a location store 71 assigned to the d- block and in which now the ROM 60 address for buffer location d5 is stored. Still as a part of the micro program 2 and following such saving storage, the stage 69 increments the access address for store 71 by "1" to access the location in store 71 which holds the ROM 60 address for the next buffer address in the next block, which, in this case (we consider presently, as an example the frame 4) is the ROM 60 address for e4.

Whenever during a frame a jump is called for to the next block and the preceding block has been completed, micro program and operation code 3 are called for. This will occur whenever the ROM 60 address refers to the ROM 60 location holding the buffer addresses for a5, b2, c3, d6, e4, f44, and S (the S- location will be explained shortly). Each of these buffer addresses are accompanied in ROM 60 by the operation code for micro program 3. The content of register counter 73 will not be incremented nor saved. Rather, the respective buffer addresses will access ROM 75 to draw therefrom the ROM 60 starting address of that same block to be set into the store 71 being accessed accordingly. Thus, as the case may be, the ROM 60 address for buffer locations a1, or b1, or c1, etc. is fed to store 71. Circuit 69 accesses the appropriate location in store 71 which is to hold the relevant block address (as a ROM 60 address) and which, as the case may be, holds just prior to that updating the ROM 60 address for buffer location a4, b1, c2, d5, e3, and/or f11 because one or the other of these latter ROM addresses were the ones saved previously as return points for completing the respective blocks which has just been done, requiring as far as the respective block concerned, updating by extracting a ROM 60 block starting address from store 75.

It can thus be seen that gating device 77 controls whether a particular location in store 71 is to be updated by the respective ROM 60 starting address or by the return point address pertaining to a block either to be continued or completed as far as presentation of the respective buffer address by ROM 60 is concerned. The former case is part of micro program 3 causing gate 77 to pass the properly identified ROM 60 starting block address to store 71; return point saving is part of micro program 2 and causes the incremented content of counter 73 to be fed to store 71 via gate 77.

In addition to the foreoing, the micro program 3 causes the current ROM 60 address for the next block then held in 71 to be fed into register 72 for transfer to 73. This may be a ROM 60 address which was previously saved or a ROM 60 starting address for that next block. That, of course, is the required operation to continue ROM 60 read-out in accordance with the desired PCM frame format.

In addition to the various ROM 60 addresses pertaining to buffer addresses, store 71 holds a ROM 60 address for a not implemented buffer address which could be termed the S-address. That address can be treated, as far as the process of the program and operation is concerned just as any other buffer address, and it will be accompanied by a operation code for micro program 3 calling for the next block without any saving operation. Strictly speaking, this is a redundancy as far as the transfer from 75 is concerned, but it is inadvisable to establish a micro program just for the S-case. However, the buffers will ignore that address on the address lines of bus 34. Instead, the device 39 will insert the S-code as a beginning-of-frame marking into the PCM data stream.

It can thus be seen, that the PCM frame is assembled in a manner which by way of example includes the following sequence of operations. Take frame 2, the S code address will be loaded from 71 to 73 because it is presumed that upon incrementing the decoded f34 buffer address by one, 69 recycled the 71 access from the address for the RAM 71 location holding the next-to-be-used ROM 60 address for the f block, to the address for the RAM 71 location holding the ROM 60 S-code address. As the S code buffer "address" appears at the output of ROM 60, device 39 places the S-code onto the data bus and device 36 causes the frame count number to be incremented by one, all masks (52) are switched to frame 1. The S-buffer address is accompanied by a micro program 3 op code, so that the ROM 60-address for S is fetched from 75. The access address for RAM 71 is incremented by "1" and the a-block ROM 60 starting address is fed from 71 to 72, 73. For the next four ROM 60 read outs, micro program 1 codes appear, causing accordingly consecutive addresses to be applied to ROM 60 for read out of the a2 to a5 buffer address which appear on bus 34. The data are extracted in that sequence from the appropriate buffers, being in each instance a 33a1 buffer.

The buffer address for a5 is accompanied by a micro program 3 code causing the a block ROM 60 starting address to be transferred from 75 to 71, followed by fetching from 71 the previously saved return point ROM 60 address for the b-block which is the ROM 60 address for b2. The latter is also accompanied by the block end micro program op code 3 and the previously saved ROM 60 C-block return point address (being the ROM 60 address for C2) is transferred to 73. The C2 buffer address is accompanied by a micro program 2 code, so that the ROM 60 address in 73 is incremented by "1" and stored 1 being the ROM 60 address for C3 as return point for the next frame. Slide part of mic-2 is the loading of 73 by the previously stored e-block return address which is the ROM 60 address for e2, etc., etc. Please note that each block is called on at least once, which is the reason that the RAM 71 access is operated on a cyclic basis, so that 69 accesses the seven locations in RAM 71 in the same sequence for each frame.

It should be noted that device 73 does not have to be an independent counter but one can use the added 74 instead. This means that the micro programs 1 and 2 may have greater similarities. In each of these cases the content of register 73 is incremented by "1" by operation of the adder 74 and the incremented address is applied to store 71 via gate 77. The concurrently read out buffer address is applied to stage 69 which decodes it without incrementing the result and, thus, accesses the particular location in store 71 associated with a current ROM 60 address for the block worked presently. Thus, that location is updated always in routines or micro programs 1 and 2.

Now, in the case of micro program 1 as identified by the operation code which accompanied the read out buffer address, the same location in store 71 is read out again and passes to register 73. That loop operation continues as long as buffer addresses from the same block are continued to be extracted from the ROM 60. In routine or micro program 2 the situation is different. Micro program 2 is used for exiting from a block without completion. In that case, not the same but the next location in store 71 is read out; the micro program 2, therefore, causes stage 69 to be incremented by "one" after the saving operation of the block exit point has been completed.

In addition to the components described above, processor P1 and here particularly the formating device 41 thereof has an initialization stage 70 which resets devices 72 and 73 to the starting position such as an all zero bit content. This may occur during the initialization program being the micro program or routine 4 which can be carried out at any time during the last four word periods in terms of the PCM output train and main format. These four periods occur particularly at the end of frame period 12 (see FIG. 4). For example, at the end of frame 11 the buffer address for data word f44 appeared at the output of ROM 60. Actually that address should be accompanied by an instruction code calling for a micro program 2. Instead, it may call for a micro program 2 causing the ROM 60 address to be incremented by one and saved. That ROM address will be recalled during the twelfth frame period following access to the ROM 60 location for e4. That ROM 60 location now accessed may hold no implemented buffer address, but only the operation code for micro program 4.

Micro program 4, when initiated by appearance of its operation code in register code 76, causes the starting ROM 60 address for the blocks such as the ROM 60 addresses for a1, b1, c1, etc., to be fed from ROM 75 to store 71. These two storage facilities are being sequentially accessed by micro program execution causing step wise accessing of ROM 75 as well as step wise accessing of store 71 to obtain the transfer of these addresses. Of course, this is preceded by storing in store 71 the ROM 60 address for the S-code address. The S-code address is not really an address; it is a code that represents a not-implemented buffer address. Also, during this micro program 4 execution, four PCM word periods are just metered during which the stage 39 sets the ZZ codes three times into the bus 34 followed by the S-bar code followed in turn by causing the S-ROM 60 address to be fed from store 71 to register 73 which marks the beginning of the next PCM main frame.

Following the read out of a buffer address from ROM 60 the content of that particular one of the twin buffers then operating in the read mode will appear on the data bus 34. The operating micro program which is included and run through following the read out of each buffer address includes now operation of processing that the content of that buffer address. Therefore the processor controller 61 controls the parallel heading of a serial to parallel converter 66 pertaining to block 40 (see also FIG. 2) receiving that buffer content from the data bus in parallel-by-bit format. The circuit 66 under control of the timing circuit 65 provides a train of bit signals which is suitably encoded or modulated in the circuit 67 which in turn controls an output amplifier 68. The data now presented in a format which represents directly the PCM frame, i.e., the main frame. The sequence of presentation is given by a row-by-row sequence of the array as depicted in FIG. 5.

The content of any accessed ROM 60 location is also applied to a comparator 80 receiving also the S code ROM address. Upon agreement, the beginning of a new frame is identified therewith. Response of comparator 80 controls the frame counter 81. The elements 80 and 81 together constitute the device 36 that provides the frame count signals to the masking control circuit 52 (in FIG. 3) to the buffer circuits. The S-addresses appear also on data bus 34 but data are not supplied from any buffer. Instead the unit 39 responds and applies the S-code to the bus in lieu of a data word to be fed also into the PCM train generating stage 40. It can thus be seen that the PCM processor P1 provides buffer addresses for the buffers 33 in accordance with the sequences as given by the desired PCM format using a specific reservoir of addresses assembled in store 71. Thereby a continuous sequence and train of PCM signals is generated in that the various buffer contents are concatenated by the sequential read out. Minimizing processing can be obtained only, if, as has been done here, the conventional concept of a central store is abandoned. The inventive system operates with plural parallel operating processors and buffers as is thus enabled to provide for concurrent presentation of data held in different buffer locations and originating in different transducer locations.

As outlined earlier in detail the system, as described above, is based on the parallel operations of three autonomously operating stores and storage facilities. These are the PCM address stores 60, the store for the block starting addresses 75 and the buffers 33. In addition the counter logic provides PCM frame addresses (count numbers) for sequencing the updating and copying process in the several buffer access circuits. It should be noted, that in addition the several processors P2 to Pm have also access to the buffers, particularly the several buffers 33b which are continuously updated.

The invention is not limited to the embodiments described above but all changes and modifications thereof not constituting departures from the spirit and scope of the invention are intended to be included.

We claim:

1. A data acquisition system having a plurality of transducers whose outputs are to be acquired, comprising:
   a plurality of independently and parallelly operating commutators each connected to and cyclically interrogating some of the transducers of the plurality in independent cycles and each providing an unbuffered PCM signal train, there being a plurality of independent and parallel PCM signal trains accordingly;
   A plurality of decommutators connected for respectively receiving the signal trains and respctively operating in synchronism with the respective commutator cycles for separating the signals in accordance with their respective transducer origin;
   a plurality of independently addressible buffer means respectively connected to the decommutators for storing the separated signals as data in individually addressible locations;
   means included in each buffer means for accessing the locations in synchronism with the decommutation cycles;
   a common data bus connected to all of the buffer means of the plurality of buffer means; and
   a plurality of independently operating processors connected to the bus, each having independent access to all said buffer means of the plurality to extract therefrom the signals as stored for processing.

2. A data acquisition system as in claim 1, each said buffer means including a pair of buffers operated alternatingly for reading and writing, and means for selectively masking particular buffer locations for selective updating only unmasked locations of one of the buffers with separated signals from the respective decommutator.

3. A data acquisition system as in claim 2, wherein the means for selective masking causes masked locations in the respective buffer operated for writing to be loaded with signals copied from the respective other buffer of the pair concurrently operated for reading.

4. A data acquisition system as in claim 2, one of said processors being a formatting processor connected for controlling the selectivity as far as timing is concerned so that the selectivity is changed concurrently in all of said buffer means.

5. A data acquisition system as in claim 4, said formatting processor providing a train of address signals for extracting from said buffer means a train of data signals on a cyclically repetitive basis defining a PCM frame wherein some of the locations of the several buffer means are accessed for read-out more than once during such frame.

6. A data acquisition system as in claim 1, each said buffer means including first buffer means for storing separated signals thereby updating the contents of the several locations of the first buffer means, and including control means for obtaining different frequencies of updating in that not all locations of the first buffer means are updated in each commutation cycle the processors including a processor for extracting from all said buffer means a data train in which the content of more frequently updated buffer locations occurs more frequently than others.

7. A data acquisition system as in claim 6, wherein each said buffer means includes a second buffer other than the fist buffer means and connected to have its locations updated with separated signals in each cycle, the processors including at least one additional processor for extracting data from said second buffer.

8. A data acquisition as in claim 7 including a plurality of feedback loops, each loop including (i) at least one transducer of the plurality monitoring a condition, (ii) one of said commutator, (iii) one of said decommutator, (iv) one of said buffer means, (v) said one additional processor and (vi) means operated by the additional processor to control the condition monitored by the one transducer.

9. A data acquisition system as in claim 1, said circuit means including a processor having a first ROM for storing buffer addresses, means for controlling a sequence of access steps to the first ROM to extract therefrom a sequence of buffer addresses;
   means for feeding the sequence of addresses to all said buffer means for extracting therefrom stored signals.

10. A data acquisition system as in claim 1, each of the buffer means including means for selectively controlling the frequency of updating any content of the several locations in the respective buffer means with separated signals from the respective decommutators.

11. A data acquisition system having a plurality of transducers whose outputs are to be acquired, comprising:
   a plurality of independently and parallelly operating commutators, each being connected to and cyclically interrogating some of the transducers of the plurality in idependent cycles and providing an unbuffered PCM signal train, there being a plurality of independent parallel PCM signal trains accordningly;
   a plurality of decommutators connected for respectively receiving the signal trains of the plurality for separating the signals in accordance with their respective transducer origin so that for each commutation cycle there is a corresponding decommutation cycle in which separated signals from each transducer connected to the respectively associated commutator appear, once per cycle;
   a plurality of independently addressible buffer means respectively connected to the decommutators for storing the separated signals as data in individually addressable locations, the same location being updated as to its data content upon being addressed in sequential cycles to receive the separated signals as new data from the respective decommutators or otherwise;
   means included in each of the buffer means for selectively controlling the updating of the storage locations in the buffer means, so that some of the locations receive new data from the respective decommutator less frequently than once per commutator-decommutator cycle; and
   a processor having access to all said buffer means for providing a sequence of buffer addresses for extracting from the buffer means of the plurality data as stored, independently from the commutation cycles, and assembling the data as sequentially extracted to provide a stream of data within a main frame, being repeated on a cyclic basis wherein data within a main frame, having originated in some of the transducers appear more than once in such a main frame, data having originated in other ones of the transducers appearing only once in the main frame, the buffer locations storing the signals from said other transducers having been updated less frequently by operation of said means for selectively controlling.

12. A data acquisition system as in claim 11, said processor including addressible storage means for buffer location addresses and means for assembling a sequence of access steps for access to said storage means to read said buffer locations addresses in a particular sequence to obtain said extracting.

13. A data acquisition system as in claim 12, said means for assembling including a store for particular access addresses to said storage means, counter means to provide sequential access addresses for sequential access to said storage means for said storage means to provide a corresponding sequence of buffer addresses and means under control of said processor to extract a different particular address from said store to jump to a different address continuum of addresses of said storage means, the buffer addresses provided by the storage means before and after the jumps pertaining to transducers whose outputs are differently frequent represented by data in the data stream.

14. A system as in claim 11, each said buffer means including a pair of buffers operated alternatingly for reading and writing;

first control means for and in each said buffer means, for selectively copying the content of one or several locations of the buffer operated for reading, into a parallelly addressed location or locations in the buffer operated for wiring, the latter one being one of the locations of said some locations which receive data less frequently, other locations of the buffer operated for writing receiving data from the decommutator.

15. A system as in claim 14, including means for alternating the operation of said buffers, each buffer maintaining its mode of operation, reading or writing, for a frame period, said main frame being composed of a plurality of said frame periods.

16. A system as in claim 15, including additional control means for each buffer means for changing the selectivity of said first control means.

17. A data acquisition system having a plurality of transducers whose outputs are to be acquired, comprising:
    a plurality of independently and parallelly operating commutators each connected to and cyclically interrogating some of the transducers of the plurality in independent cycles and each providing an unbuffered PCM signal train, there being a plurality of independent and parallel PCM signal trains accordingly;
    a plurality of decommutators connected for respectively receiving the signal trains and respectively operating in synchronism with the respective commutation cycle for separating the signals in accordance with their respective transducer origin;
    a plurality of independently addressible buffer means respectively connected to the decommutators for storing the separated signals as data in individually addressible locations;
    a data bus connected to all of said buffer means of the plurality of buffer means; and
    a processor providing a particular sequence of address signals for all said buffer means, each of said address signals being effective in but one of the buffer means to extract from the respectively accessed location data stored therein so that pursuant to the sequence of address signals data are assembled in a data stream on said bus.

18. A system as in claim 17, said processor including means for providing the address signals differently frequent for different locations of the buffer means of the plurality so that data having originated in some of the transducers are less frequently included in the stream than data from other transducers.

* * * * *